(12) United States Patent
Iourcha et al.

(10) Patent No.: US 8,330,767 B2
(45) Date of Patent: Dec. 11, 2012

(54) METHOD AND APPARATUS FOR ANGULAR INVARIANT TEXTURE LEVEL OF DETAIL GENERATION

(75) Inventors: Konstantine Iourcha, San Jose, CA (US); Michael Doggett, Lund (SE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 896 days.

(21) Appl. No.: 12/409,592

(22) Filed: Mar. 24, 2009

(65) Prior Publication Data

US 2010/0245374 A1  Sep. 30, 2010

(51) Int. Cl.
  *G09G 5/00* (2006.01)
(52) U.S. Cl. ........ 345/582; 345/428; 345/522; 345/552; 345/587
(58) Field of Classification Search .................. 345/423, 345/441
  See application file for complete search history.

(56) References Cited

U.S. PATENT DOCUMENTS

| | | | | |
|---|---|---|---|---|
| 5,774,129 | A * | 6/1998 | Poggio et al. ................. | 345/441 |
| 6,064,393 | A * | 5/2000 | Lengyel et al. ............... | 345/427 |
| 6,219,064 | B1 * | 4/2001 | Kamen et al. ................. | 345/582 |
| 6,236,405 | B1 | 5/2001 | Schilling et al. | |
| 6,292,193 | B1 * | 9/2001 | Perry et al. .................... | 345/582 |
| 6,987,517 | B1 | 1/2006 | Donovan et al. | |
| 7,167,181 | B2 * | 1/2007 | Duluk et al. ................... | 345/506 |
| 7,369,136 | B1 * | 5/2008 | Heckbert et al. .............. | 345/582 |
| 7,573,474 | B2 * | 8/2009 | Hoppe et al. .................. | 345/423 |
| 7,576,738 | B2 * | 8/2009 | Litke et al. .................... | 345/420 |
| 2002/0181802 | A1 * | 12/2002 | Peterson ....................... | 382/284 |
| 2003/0076319 | A1 * | 4/2003 | Hiraga .......................... | 345/420 |
| 2004/0207622 | A1 * | 10/2004 | Deering et al. ............... | 345/426 |
| 2004/0257376 | A1 | 12/2004 | Liao et al. | |
| 2005/0225550 | A1 * | 10/2005 | Hoppe et al. .................. | 345/419 |
| 2006/0267978 | A1 * | 11/2006 | Litke et al. .................... | 345/419 |
| 2007/0182753 | A1 | 8/2007 | Isidoro et al. | |

FOREIGN PATENT DOCUMENTS

| EP | 1 434 171 A2 | 6/2004 |
|---|---|---|
| WO | 2006/031213 A1 | 3/2006 |

OTHER PUBLICATIONS

Sander, Pedro V., John Snyder, Steven J. Gortler, and Hugues Hoppe. 2001. Texture mapping progressive meshes. SIGGRAPH 2001, Los Angeles, Calif. In In Proceedings of the 28th annual conference on computer graphics and interactive techniques (SIGGRAPH 2001), Aug. 12-17, 2001, Los Angeles, Calif., ed. SIGGRAPH and Eugene L. Fiume, 409-416. New York.*

Heckbert, "Fundamentals of Texture Mapping and Image Warping", Master's Thesis under the direction of Carlo Sequin, Department of Electrical Engineering and Computer Science, University of California, (Berkeley, CA, Jun. 17, 1989).

Schilling et al., "Texram: A Smart Memory for Texturing", IEEE Computer Graphics and Applications, (May 1996).

(Continued)

*Primary Examiner* — Xiao M. Wu
*Assistant Examiner* — Phi Hoang
(74) *Attorney, Agent, or Firm* — Volpe and Koenig, P.C.

(57) ABSTRACT

A method and apparatus for angular invariant texture level of detail calculation is disclosed. The method includes a determination for a LOD that determines angular invariant LODs that result in efficient ASIC hardware implementation.

24 Claims, 5 Drawing Sheets

OTHER PUBLICATIONS

Williams, "Pyramidal Parametrics", Computer Graphics laboratory, New York Institute of Technology, vol. 17, No. 3, (Old Westbury, New York, Jul. 1983).

Ewins, et al. "Implementing an anisotropic texture filter" Computers & Graphics 24 (2000) 253-267 Copyright 2000 Elsevier Science Ltd.

Ewins, et al. "MIP-Map Level Selection for Texture Mapping" IEEE Transactions on Visualization and Computer Graphics, vol. 4, No. 4, pp. 317-329 Copyright 1998 IEEE.

Shirman et al. "A new look at mipmap level estimation techniques" Computers & Graphics 23 (1999) 223-231 Copyright 1999 Elsevier Science Ltd.

* cited by examiner

METHOD AND APPARATUS FOR ANGULAR INVARIANT TEXTURE LEVEL OF DETAIL GENERATION

FIELD OF INVENTION

The present invention is directed to texture mapping.

BACKGROUND

Synthetic image generation is the process of generating two-dimensional (2D) images from digitally created three-dimensional (3D) scenes. The image generation process includes 3D models of objects which are rendered into a 2D image.

To improve the appearance of the 3D models, textures, also known as color maps, are applied to the 3D objects. These textures can have one, two three or more dimensions and are mapped onto the surface of 3D objects using a mapping function. This mapping of textures onto an object is called texture mapping.

The 3D space is mapped to the 2D image using a perspective transformation. This transformation results in close objects being shown as bigger and objects which are farther away being shown as smaller. For closer objects, a higher level of detail is observed on the surface of the object. As the object moves further away from the view point (viewer's perspective), the object gets smaller and the level of detail (LOD) on the object is accordingly reduced. The LOD of the 3D object can be computed via a variety of methods.

As the surface onto which a texture is mapped is reduced in size in the 2D image the original texture map is reduced. This process is called minification. Minification requires that all of the individual colors within the texture (known as texels) are sampled and filtered together to compute the final color value for applying to the 3D object. The area of texels that is sampled from the texture map is based on the projection of the image pixels onto the texture map. For large texture map minification, this filtering would require processing a large number of texels, thus increasing the computation time. This computation time can be significantly reduced by precomputing the filtered results using a number of different methods, including but not limited to mipmapping, summed area tables, and elliptical weighted average.

Mipmapping takes the texture map at its highest level of detail and generates several lower levels of detail texture maps in a series. For example, if the highest level of detail texture map is a color image of 512×512 resolution, mipmapping may generate a series of textures at lower resolutions such as 256×256, 128×128, 64×64, 32×32, 16×16, 8×8, 4×4, 2×2, and 1×1. Each texel in the new image can be calculated by segmenting the higher resolution image into 2×2 pixel segments and computing the average texture values for each of these segments. Other filters to produce the lower resolution images may also be used. For example, a summed area table computes the sum of all texels from the origin of the texture to the current location in the texture. The newly created lower resolution textures represent the original texture in a new image with a different (i.e., reduced) level of detail (LOD). When the 3D object is rendered, a final color value is generated based upon a selection, or selections, from these LOD images.

For the 2D case, the LOD is computed from the size of the projection of the 2D image pixel into the 2D texture space. For the equations below, if pixel coordinates are referred to as x, y then the texture space coordinates are referred to as u, v.

The projection can be represented by the partial derivatives which are estimated from the change in the texture coordinates across a quad. These partial derivatives are also known as the texture coordinate derivative (or gradient). 2D texture mapping has four components du/dx, du/dy, dv/dx, dv/dy. One conventional method for computing LOD is as follows:

$$lod = \log_2\left(\max\left\{\sqrt{\left(\frac{\partial u}{\partial x}\right)^2 + \left(\frac{\partial v}{\partial x}\right)^2}, \sqrt{\left(\frac{\partial u}{\partial y}\right)^2 + \left(\frac{\partial v}{\partial y}\right)^2}\right\}\right) \quad \text{Equation (1)}$$

As the texture map and 3D object rotate and the angle changes with respect to the screen coordinates, the above algorithm computes a changing LOD value, though the value should stay constant under rotational change.

The LOD value is used to select one of the LOD images. For objects that are at oblique viewing angles and the projection of the texture is at a large angle to the camera, the above LOD computation will result in selecting over blurred LOD images. Anisotropic filtering is a method of improving the texture filtering by selecting a less blurry LOD image and filtering that level according to the pixel projection into the texture space.

Figure 1:
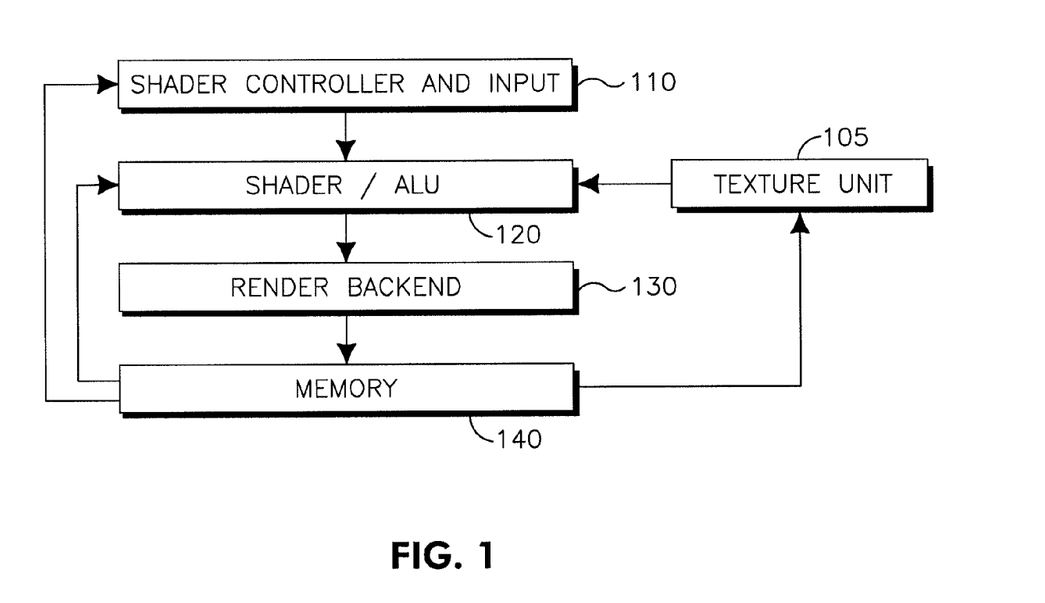
FIG. 1 shows a conventional GPU.

Modern graphics processing units (GPUs) are designed to render 3D scenes (images). A high level diagram of a conventional GPU 100 is shown in FIG. 1. A GPU 100 can include multiple components such as a shader controller and input unit 110, a programmable shader unit 120, a render backend 130 and a memory 140. The programmable shader 120 runs programs that perform rendering algorithms to transform the 3D objects into a 2D image. The programmable shader 120 comprises hundreds of arithmetic logic units (ALUs). Older GPUs used custom hardware logic for the transformation and color computation stages instead of the programmable shader 120.

A shader controller and input unit 110 reads the input for a variety of computer graphics programs that are performed on the programmable shader 120 in a sequence of stages that comprise the graphics pipeline. The shader controller and input unit 110 can contain several fixed function, custom designed hardware stages of the graphics pipeline including, but not limited to: tessellation, triangle setup, and rasterization. These graphics pipeline stages can also be implemented in software on some graphics devices. The shader controller and input unit 110 also controls the execution of the programs on the programmable shader unit 120 by switching between a large number of programs that are waiting to run.

When texture data is accessed via a hardware texture unit or a program that issues a texture instruction running on the programmable shader 120, texture data is read from memory 140 into the texture unit 105 and texels are selected from the texture unit 105 and returned to the programmable shader 120.

Once a final color value is calculated in the programmable shader 120, the result is sent to the render backend unit 130 which tests the visibility of the color and blends the color with existing colors (color and Z operations) in the frame buffer in memory 140 and writes the final result into the memory 140. The color result from the shader can also use Z and color operation units that are implemented in software on programmable devices.

The texture unit 105 computes a LOD value as well as the memory address of the texture before reading it from the memory 140. The programmable shader 120 sends the current pixel position (x,y) and the current texture coordinates for that pixel (u,v) to the texture unit 105. The programmable shader 120 sends a 2×2 group of neighboring pixels to the texture unit 105. Using the 2×2 group, the texture unit 105 can estimate a rate of change of the texture coordinates (called derivatives) with respect to the pixel coordinates using partial differences as follows $$u_x = u_{Pixel1} - u_{Pixel0};\qquad\text{Equation (2)}$$

$$v_x = v_{Pixel1} - v_{Pixel0};\qquad\text{Equation (3)}$$

$$u_y = u_{Pixel2} - u_{Pixel0};\text{ and}\qquad\text{Equation (4)}$$

$$v_y = v_{Pixel2} - v_{Pixel0}.\qquad\text{Equation (5)}$$

These estimates can be arranged as a Jacobian matrix as follows:

$$J = \begin{pmatrix} u_x & u_y \\ v_x & v_y \end{pmatrix}.\qquad\text{Equation (6)}$$

Using the following equations:

$$A = v_x^2 + v_y^2;\qquad\text{Equation (7)}$$

$$B = -2(u_x v_x + u_y v_y).\qquad\text{Equation (8)}$$

$$C = u_x^2 + u_y^2;\text{ and}\qquad\text{Equation (9)}$$

$$F = (u_x v_y - u_y v_x)^2;\qquad\text{Equation (10)}$$

new values $au_x$, $au_y$, $av_x$, $av_y$ can be calculated as follows:

$$au_x = \sqrt{\frac{F(t+r)}{t(s+t)}};\qquad\text{Equation (11)}$$

$$av_x = \operatorname{sign}(Br)\sqrt{\frac{F(t-r)}{t(s+t)}};\qquad\text{Equation (12)}$$

$$au_y = -\operatorname{sign}(Br)\sqrt{\frac{F(t-r)}{t(s-t)}};\text{ and}\qquad\text{Equation (13)}$$

$$av_y = \sqrt{\frac{F(t+r)}{t(s-t)}};\qquad\text{Equation (14)}$$

where:

$$r = A - C,\ s = A + C\text{ and } t = \operatorname{sign}(r)\sqrt{r^2 + B^2}.$$

The new values $au_x$, $au_y$, $av_x$, $av_y$ can be used instead of the texture coordinate partial derivative estimates and substituted into Equation (1) to compute an LOD value. This method improves the LOD determination by ensuring that it is angularly invariant. The method still requires the LOD calculation of Equation (1) and adds a complex solution requiring a large and slow application specific integrated circuit (ASIC) implementation. A new method for determining the LOD value used to select from among a series of texture maps, which is computationally efficient and reduces the size of the corresponding ASIC implementation, is highly desirable.

SUMMARY

A method and apparatus for efficient angular invariant texture level of detail determination is disclosed. The method includes a determination for a LOD that determines angular invariant LODs that result in efficient ASIC hardware implementation.

DETAILED DESCRIPTION

When referred to hereafter, the term "map" refers to a "texture map." A method and apparatus for efficient angular invariant texture level of detail generation is disclosed. The method includes a new way to determine a LOD that generates angular invariant LODs that result in efficient ASIC hardware implementation. Texture unit changes described herein may be applied to either older or newer GPUs.

Figure 2:
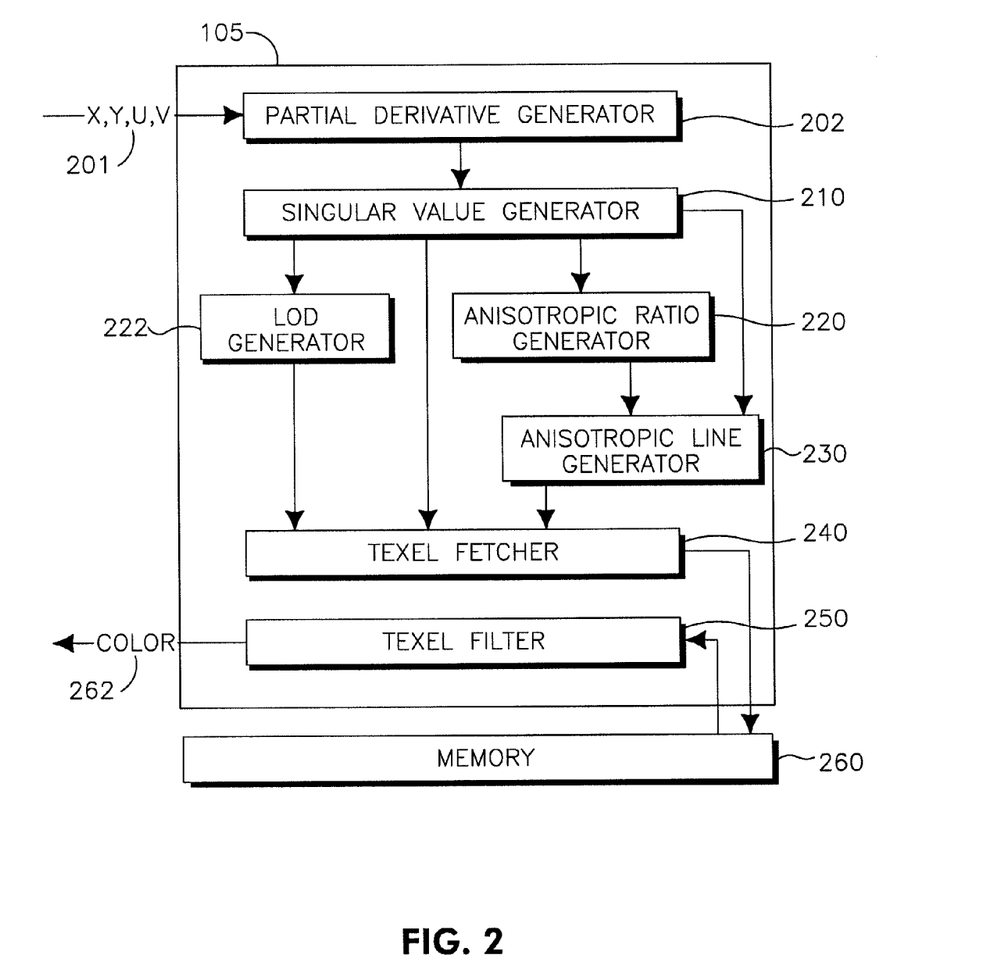
FIG. 2 is a block diagram of a texture unit using an example implementation for angular invariant LOD calculation.

FIG. 2 is a block diagram of one example of a texture unit 105 that performs angular invariant LOD generation. The texture unit 105 includes a partial derivative generator 202, a singular value generator 210, an anisotropic ratio (AR) generator 220, a LOD generator 222, an anisotropic line (AL) generator 230, a texel fetcher 240, a texel filter 250 and a memory 260. In general, as shown in FIG. 2, coordinates x, y, u and v are input at 201, and the partial derivative generator 202 calculates the partial derivative estimates. The singular value generator 210 calculates singular values using the calculated partial derivatives. The LOD is determined by the LOD generator at 222 using a singular value. The AR is determined by the AR generator at 220 and the AL is calculated by the AL generator at 230, using the singular values. The LOD value, AR and the AL are used if they (any one or any combination) exist to determine an updated position for the texels, otherwise the current texture map position is used, the appropriate texels (based upon the position) are fetched by a texel fetcher at 240 from memory 260. The texture unit 105 may also share memory with the GPU 100. The resulting texels are passed through a texel filter at 250 and the resulting color texels are output at 262.

In one embodiment, 3D graphics are rendered using mipmapped anisotropic texture filtering. In this embodiment, referred to as LOD generation using singular value decomposition (SVD), the texturing will not vary regardless of the level of detail displayed as the object is rotated in a three dimensional scene.

To generate the correct LOD, the singular values are generated. Using the texture coordinate derivatives in the Jacobian Form:

$$J = \begin{pmatrix} u_x & u_y \\ v_x & v_y \end{pmatrix}.\qquad\text{Equation (15)}$$

The matrix J can be factorized using SVD:
M and m represent the singular values of the matrix J, where:

$$J = USV;$$  Equation (16)

where:

$$S = \begin{pmatrix} z_1 & 0 \\ 0 & z_2 \end{pmatrix};$$  Equation (17)

and the matrix S is comprised of the singular values, $z_1$ and $z_2$.
The singular values are computed as follows:
First compute the intermediate values a, b, c, d, k, and l.

$$a = u_x + v_y;$$  Equation (18)

$$b = u_y - v_x;$$  Equation (19)

$$c = u_x - v_y;$$  Equation (20)

$$d = u_y + v_x;$$  Equation (21)

$$k = \sqrt{a^2 + b^2}; \text{ and}$$  Equation (22)

$$l = \sqrt{c^2 + d^2}.$$  Equation (23)

The singular value $z_1$ is the Isotropic LOD value which is computed as:

$$z_1 = \frac{k + l}{2};$$  Equation (24)

and the singular value $z_2$ is the Anisotropic LOD which is computed as:

$$z_2 = \frac{|k - l|}{2}.$$  Equation (25)

For Anisotropic filtering, the ratio of anisotropy and the line or direction of anisotropy is calculated.
The Anisotropic ratio is calculated as:

$$\frac{z_1}{z_2}.$$  Equation (26)

The line of anisotropy can be found by computing the singular vector from the matrix U. The components of the singular vector are $\{u_1, u_2\}$. and can be calculated as follows:

$$g = \frac{1}{k};$$  Equation (27)

$$h = \frac{1}{l};$$  Equation (28)

$$m = ag + bh;$$  Equation (29)

$$n = dg + ch;$$  Equation (30)

$$o = ag - bh;$$  Equation (31)

$$p = dg - ch;$$  Equation (32)

$$u_1 = \frac{\sqrt{m^2 + n^2}}{2}; \text{ and}$$  Equation (33)

$$u_2' = \frac{\sqrt{o^2 + p^2}}{2}.$$  Equation (34)

The direction for $\{u_1, u_2\}$. is computed:

```
if ( abs(m) + abs(p) > abs(n) + abs(o) ) {
    if (((m > 0) && (p > 0)) | |((m < 0) && (p < 0)))
        u2 = – u2'; }
    else { if (((n > 0) && (o < 0)) | |((n < 0) && (o > 0)))
        u2 = – u2'; }
```

Figure 3:
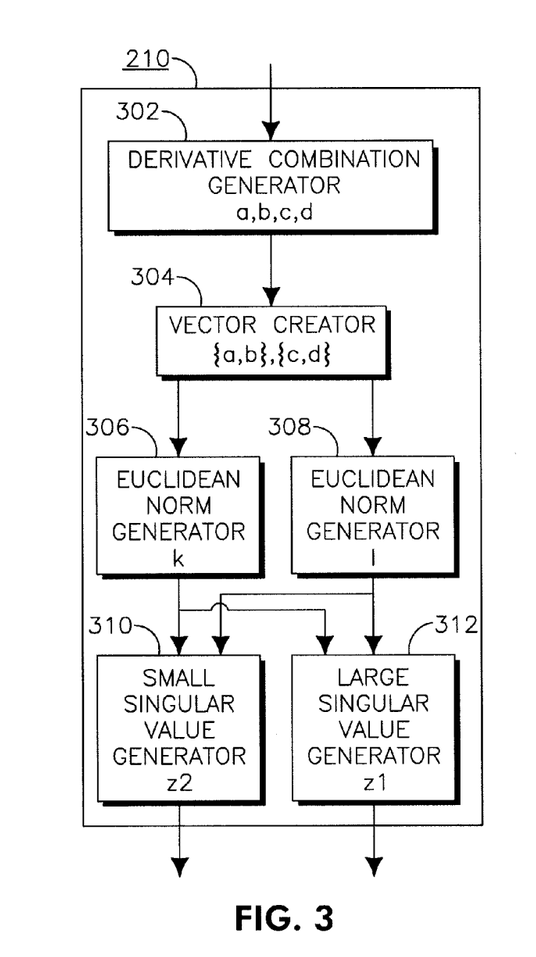
FIG. 3 is shows the components a singular value generator 210.

The calculation may also be used for 1D LOD generation in which case the $v_x$, $v_y$, derivatives would be 0. Referring to FIG. 3, a more detailed description of singular value generator 210 is provided. The singular value generator 210 comprises a derivative combination generator 302, a vector creator 304, Euclidian norm generators 306 and 308, a small singular value generator 310 and a large singular value generator 312.

The singular value generator 210 performs a linear combination of the texture partial derivatives 302, these combinations are formed into vectors 304, the Euclidean norm of the vectors is generated in 306 and 308, and the norms are then used in linear combination to generate a small singular value 310 and a large singular value 312. A more detailed description of singular value generation will be described with reference to FIG. 6 below.

Figure 4:
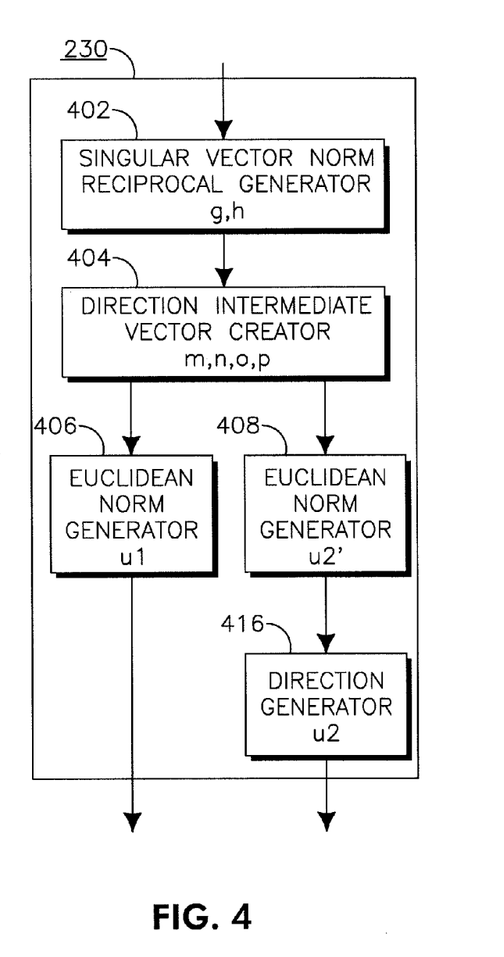
FIG. 4 shows the components of anisotropic line generator 230.

Referring to FIG. 4, a more detailed description of AL generator 230 is provided. AL generator 230 comprises singular vector norm reciprocal generator 402, direction intermediate vector creator 404, Euclidian norm generators 406 and 408, and u2 direction generator 416.

The anisotropic line generator 230 performs a reciprocal of the norms generated by the singular value generator 210. The anisotropic line generator 230 comprises a singular vector norm reciprocal generator 402 that generates singular vestor norm reciprocals, a direction intermediate vector generator that generates vectors using linear combinations of the reciprocals and previous values 404, a Euclidean norm generator that generates Euclidean norm vectors 406 and 408, and a direction generator that generates the direction of the anisotropic line 416.

Figure 5:
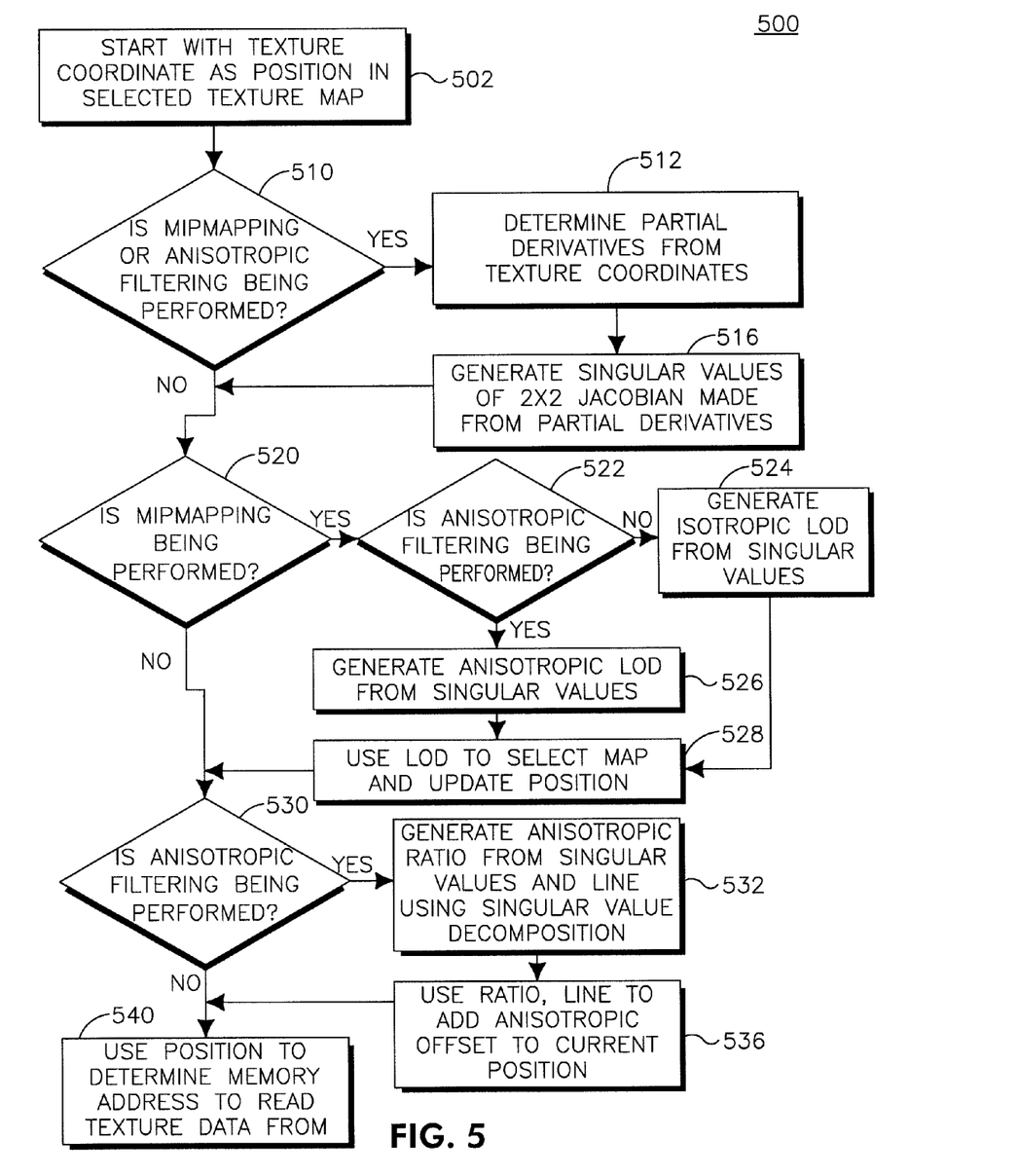
FIG. 5 is flow diagram of a method for LOD computation using singular value decomposition.

A flow diagram of a method 500 for LOD computation using SVD is shown in FIG. 5. The method 500 is initiated (502) with accepting at least one texture coordinate (e.g., output from a rasterization process not shown), which is a position (the current texture map position) in a selected texture map (e.g., a user may configure/determine which texture map is to be utilized). It is then determined if mipmapping or anisotropic filtering has been configured to be performed (e.g., by a user) (510).

If so, texture partial derivatives are computed from texture coordinates (512) and singular values are generated from a 2×2 Jacobian made (constructed) from the texture partial derivatives (516).

If not, or if the texture partial derivatives and singular values have already been computed at 512 and 516 respectively, it is determined whether mipmapping is configured to be performed (e.g., by a user) (520).

If mipmapping has been configured to be performed, it is determined if anisotropic filtering has been configured to be performed (522). If anisotropic filtering is not configured, then an isotropic LOD is computed (524) based upon a singular value (e.g., pick one singular value out of two). If anisotropic filtering has been configured then an anisotropic LOD is computed (526) based upon a singular value (e.g., pick one singular value out of two). A texture map is selected (it could be the same or a new texture map) and the current texture map position is updated (528) based upon the computed LOD (resulting from either condition). The updated current texture map position might be identical to the previous position.

If mipmapping has not been configured (a negative result at 510 and 520) or the LOD (isotropic or anisotropic) has been computed (at 524 or 526), and it is determined that anisotropic filtering is configured (530), then an AR and an AL are computed based upon the singular value decomposition (532). The AR and AL are used to generate an anisotropic offset (536) (or multiple offsets) which is added to the current texture map position (updating the current texture map position). The updated current texture map position might be identical to the previous position.

In all cases, the current texture map position (updated or not) is used to calculate a memory location from which to read (retrieved, selected) the texture mapping data (540).

Figure 6:
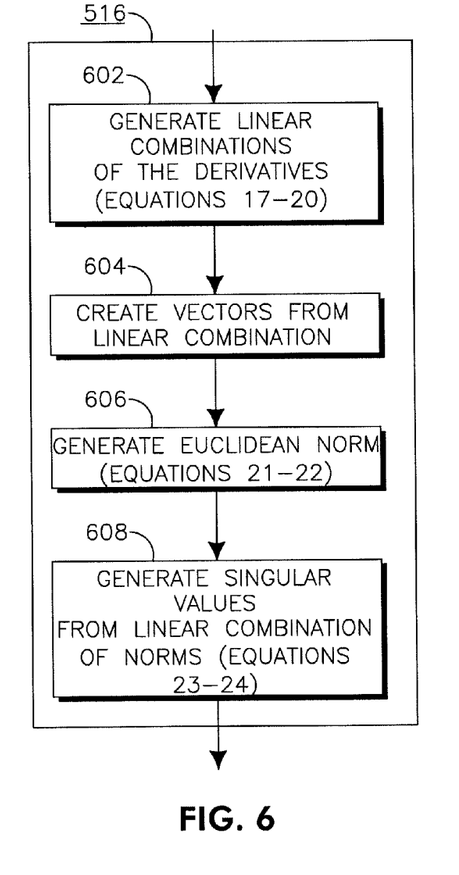
FIG. 6 is a detailed flow diagram for generate singular values 516.

Referring to FIG. 6, a more detailed description of singular value generation 516 is provided. The generation of singular values from the Jacobian matrix is performed by first generating linear combinations of the matrix elements with predefined constant coefficients 602, creating two two-dimensional vectors with the components coming from the previously generated linear combinations 604, generating the Euclidian norms (or an approximation of the Euclidian) of the vectors 606, and generating singular values as a linear combination of the generated norms of the vectors 608.

Figure 7:
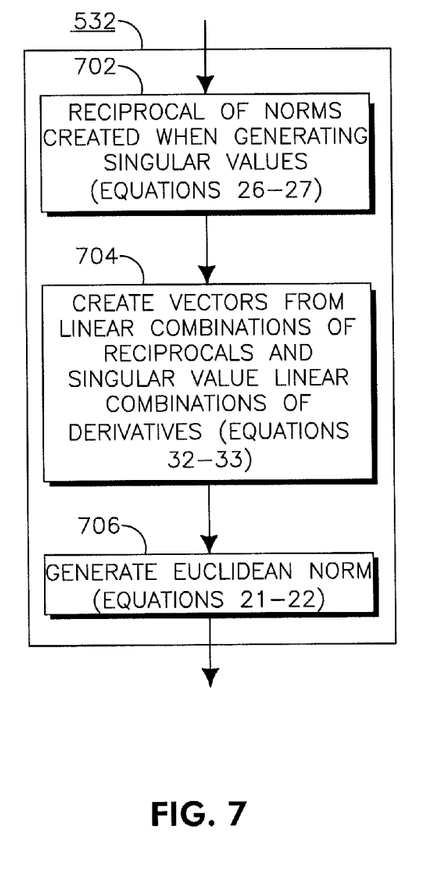
FIG. 7 is a detailed flow diagram for generating an anisotropic line using singular value decomposition 532.

Referring to FIG. 7, a more detailed description of AL generation using SVD 532 is provided. The generation of the AL from the SVD is performed by taking the reciprocal of the Euclidian norms generated during the singular value generation 702, creating linear combinations of the reciprocals with the linear combinations created during the singular value generation 704, and generating two two-dimensional vectors with the components coming from the previously generated linear combinations and then generating the Euclidean norm of these vectors 706. Also the direction of the anisotropic line is generated by comparing the magnitude and sign of the linear combinations generated previously 706.

As shown by FIG. 5, various combinations of mipmapping, no mipmapping, filtering or no filtering are possible. For example, in one embodiment with no mipmapping or filtering configured, the unmodified current texture map position will be used to calculate a memory location from which to read (retrieve) the texture data (540).

In another embodiment, any other filtering algorithm, which uses the projection of a pixel into texture space where the projection can be represented by a singular value or singular values, may be substituted in place of mipmapping (e.g., summed area tables and elliptical weighted average).

Although the features and elements are described in the example embodiments in particular combinations, each feature or element can be used alone without the other features and elements of the example embodiments or in various combinations with or without other features and elements. The present invention may be implemented in a computer program or firmware tangibly embodied in a computer-readable storage medium having machine readable instructions for execution by a machine, a processor, and/or any general purpose computer for use with or by any non-volatile memory device. Suitable processors include, by way of example, both general and special purpose processors.

Typically, a processor will receive instructions and data from a read only memory (ROM), a RAM, and/or a storage device having stored software or firmware. Storage devices suitable for embodying computer program instructions and data include all forms of non-volatile memory, including by way of example semiconductor memory devices, read only memories (ROMs), magnetic media such as internal hard disks and removable disks, magneto-optical media, and optical media such as CD-ROM disks and digital versatile disks (DVDs). Types of hardware components, processors, or machines which may be used by or in conjunction with the present invention include Application Specific Integrated Circuits (ASICs), Field Programmable Gate Arrays (FPGAs), microprocessors, or any integrated circuit. Such processors may be manufactured by configuring a manufacturing process using the results of processed hardware description language (HDL) instructions (such instructions capable of being stored on a computer readable media). The results of such processing may be maskworks that are then used in a semiconductor manufacturing process to manufacture a processor which implements aspects of the present invention.

What is claimed is:

1. A method implemented in a processor for texture mapping, the method comprising:
  inputting at least one texture coordinate as a current texture map position and if filtering based on a projection of a pixel into a texture space is configured:
  determining texture coordinate partial derivatives; and
  generating singular values of a Jacobian matrix constructed from the texture coordinate partial derivatives comprising:
    generating linear combinations of the matrix elements with predefined constant coefficients;
    forming two two-dimensional vectors from the linear combinations;
    generating Euclidian norms or approximation of Euclidian norms, from the vectors; and
  generating singular values as linear combinations of the norms.

2. The method of claim 1, wherein filtering based on a projection of a pixel into a texture space is mipmapping or anisotropic filtering.

3. The method of claim 2 further comprising:
  if mipmapping is configured:
    if anisotropic filtering is not configured:
      determining an isotropic level of detail (LOD) from a selected singular value from the generated singular values;
      selecting a texture map based upon the LOD;
      updating the current texture map position; and
      selecting texture data based upon the current texture map position.

4. The method of claim 2 further comprising:
  if mipmapping is configured:
    if anisotropic filtering is configured:
      generating an anisotropic level of detail (LOD) from a selected singular value from the generated singular values;
      selecting a texture map based upon the LOD; and
      updating the current texture map position.

5. The method of claim 4 further comprising:
  generating anisotropic ratio and anisotropic line from singular value decomposition comprising:
    determining the reciprocal of the Euclidian norms;

creating linear combinations of the reciprocals of the linear combinations and generating two two-dimensional vectors from the linear combinations; and generating the Euclidean norm of the vectors;

adding anisotropic offset to update the current texture map position; and selecting texture mapping data based upon the current texture map position.

6. The method of claim 2 further comprising:

if mipmapping is not configured:

generating an anisotropic ratio and an anisotropic line from singular value decomposition comprising:

determining the reciprocal of the Euclidian norms;

creating linear combinations of the reciprocals of the linear combinations and generating two two-dimensional vectors from the linear combinations; and generating the Euclidean norm of the vectors;

adding at least one anisotropic offset to update the current texture map position; and selecting at least one texture mapping data based upon the current texture map position.

7. The method of claim 2 further comprising selecting texture mapping data based upon the current texture map position.

8. A method implemented in a processor for texture mapping, the method comprising:

inputting at least one texture coordinate as a current texture map position;

if mipmapping or anisotropic filtering is configured:

determining texture coordinate partial derivatives;

generating singular values of a Jacobian matrix constructed from the texture coordinate partial derivatives comprising:

generating linear combinations of the matrix elements with predefined constant coefficients;

forming two two-dimensional vectors from the linear combinations;

generating Euclidian norms or approximation of Euclidian norms, from the vectors; and generating singular values as linear combinations of the norms;

if mipmapping is configured:

if anisotropic filtering is not configured:

generating an isotropic level of detail (LOD) from a selected singular value from the generated singular values;

selecting a texture map based upon the LOD; updating the current texture map position;

if anisotropic filtering is configured:

generating an anisotropic level of detail (LOD) from a selected singular value from the generated singular values;

selecting a texture map based upon the LOD; updating the current texture map position;

if mipmapping is not configured and if anisotropic filtering is configured:

generating an anisotropic ratio and an anisotropic line from singular value decomposition comprising:

determining the reciprocal of the Euclidian norms;

creating linear combinations of the reciprocals of the linear combinations and generating two two-dimensional vectors from the linear combinations; and generating the Euclidean norm of the vectors; adding at least one anisotropic offset to update the current texture map position; and selecting at least one texture mapping data based upon the current texture map position.

9. The method of claim 1 wherein approximation of Euclidian norms is generated by using a polygonal Minkowski norm.

10. The method of claim 8 wherein approximation of Euclidian norms is generated by using a polygonal Minkowski norm.

11. A texture unit comprising:

a partial derivative generator configured to determine texture coordinate partial derivatives;

a singular value generator configured to generate singular values of a Jacobian matrix constructed from the texture coordinate partial derivatives comprising:

the singular value generator further configured to generate linear combinations of the matrix elements with predefined constant coefficients;

the singular value generator further configured to form two two-dimensional vectors from the linear combinations;

the singular value generator further configured to generate Euclidian norms or approximation of Euclidian norms, from the vectors; and the singular value generator further configured to generate singular values as linear combinations of the norms an anisotropic ratio generator configured to generate an anisotropic ratio from singular values;

an anisotropic line generator configured to generate an anisotropic line from singular value decomposition comprising:

the anisotropic line generator further configured to determine the reciprocal of the Euclidian norms;

the anisotropic line generator further configured to create linear combinations of the reciprocals of the linear combinations and generate two two-dimensional vectors from the linear combinations; and the anisotropic line generator further configured to generate the Euclidean norm of the vectors;

a level of detail (LOD) generator configured to generate anisotropic LOD or isotropic LOD;

a texel fetcher configured to select texels;

a texel filter configured to filter texels; and a memory configured to store data comprising at least one of a texel, texture data, or a frame buffer.

12. The texture unit of claim 11 wherein approximation of Euclidian norms is generated by using a polygonal Minkowski norm.

13. A non-transitory computer readable storage medium comprising:

a first set of instructions adapted to provide a processor, wherein the processor is configured to implement a second set of instructions, the second set of instructions comprising:

an input code segment for inputting at least one texture coordinate as a current texture map position and if filtering based on a projection of a pixel into a texture space is configured:

a determination code segment for determining texture coordinate partial derivatives; and a generation code segment for generating singular values of a Jacobian matrix constructed from the texture coordinate partial derivatives comprising:

a generation code segment for generating linear combinations of the matrix elements with predefined constant coefficients;

a formation code segment for forming two two-dimensional vectors from the linear combinations;

a generation code segment for generating Euclidian norms or approximation of Euclidian norms, from the vectors; and a generation code segment for generating singular values as linear combinations of the norms.

14. The non-transitory computer readable storage medium of claim 13, wherein filtering based on a projection of a pixel into a texture space is mipmapping or anisotropic filtering.

15. The non-transitory computer readable storage medium of claim 14 wherein the second set of instructions further comprises:

if mipmapping is configured:
  if anisotropic filtering is not configured:
    a determination code segment for determining an isotropic level of detail (LOD) from a selected singular value from the generated singular values;
    a selection code segment for selecting a texture map based upon the LOD;
    an update code segment for updating the current texture map position; and
    a selection code segment for selecting texture data based upon the current texture map position.

16. The non-transitory computer readable storage medium of claim 14 wherein the second set of instructions further comprises:

if mipmapping is configured:
  if anisotropic filtering is configured:
    a generation code segment for generating an anisotropic level of detail (LOD) from a selected singular value from the generated singular values;
    a selection code segment for selecting a texture map based upon the LOD; and
    an update code segment for updating the current texture map position.

17. The non-transitory computer readable storage medium of claim 16 wherein the second set of instructions further comprises:

a generation code segment for generating anisotropic ratio and anisotropic line from singular value decomposition comprising:
  a determination code segment for determining the reciprocal of the Euclidian norms;
  a creation code segment for creating linear combinations of the reciprocals of the linear combinations and generating two two-dimensional vectors from the linear combinations; and
  a generation code segment for generating the Euclidean norm of the vectors;
an adder code segment for adding at least one anisotropic offset to update the current texture map position; and
a selection code segment for selecting at least one texture mapping data based upon the current texture map position.

18. The non-transitory computer readable storage medium of claim 14 wherein the second set of instructions further comprises:

if mipmapping is not configured:
  a generation code segment for generating an anisotropic ratio and an anisotropic line from singular value decomposition comprising:
    a determination code segment for determining the reciprocal of the Euclidian norms;
    a creation code segment for creating linear combinations of the reciprocals of the linear combinations and generating two two-dimensional vectors from the linear combinations; and
    a generation code segment for generating the Euclidean norm of the vectors;
  an adder code segment for adding at least one anisotropic offset to update the current texture map position; and
  a selection code segment for selecting at least one texture mapping data based upon the current texture map position.

19. The non-transitory computer readable storage medium of claim 14 wherein the second set of instructions further comprises:

selecting texture mapping data based upon the current texture map position.

20. The non-transitory computer readable storage medium of claim 13 wherein approximation of Euclidian norms is generated by using a polygonal Minkowski norm.

21. The non-transitory computer readable medium of claim 13 wherein the first set of instructions or the second set of instructions are hardware description language (HDL) instructions.

22. A non-transitory computer readable storage medium comprising:

a first set of instructions adapted to provide a processor, wherein the processor is configured to implement a second set of instructions, the second set of instructions comprising:
  an input code segment for inputting at least one texture coordinate as a current texture map position;
if mipmapping or anisotropic filtering is configured:
  a determination code segment for determining texture coordinate partial derivatives;
  a generation code segment for generating singular values of a Jacobian matrix constructed from the texture coordinate partial derivatives comprising:
    a generation code segment for generating linear combinations of the matrix elements with predefined constant coefficients;
    a formation code segment for forming two two-dimensional vectors from the linear combinations;
    a generation code segment for generating Euclidian norms or approximation of Euclidian norms, from the vectors; and
    a generation code segment for generating singular values as linear combinations of the norms;
if mipmapping is configured:
  if anisotropic filtering is not configured:
    a generation code segment for generating an isotropic level of detail (LOD) from a selected singular value from the generated singular values;
    a selection code segment for selecting a texture map based upon the LOD;
    an update code segment for updating the current texture map position;
  if anisotropic filtering is configured:
    a generation code segment for generating an anisotropic level of detail (LOD) from a selected singular value from the generated singular values;
    a selection code segment for selecting a texture map based upon the LOD;
    an update code segment for updating the current texture map position;
if mipmapping is not configured and if anisotropic filtering is configured:
  a generation code segment for generating an anisotropic ratio and an anisotropic line from singular value decomposition comprising:
    a determination code segment for determining the reciprocal of the Euclidian norms;

a creation code segment for creating linear combinations of the reciprocals of the linear combinations and generating two two-dimensional vectors from the linear combinations; and a generation code segment for generating the Euclidean norm of the vectors;

an adder code segment for adding at least one anisotropic offset to update the current texture map position; and a selection code segment for selecting at least one texture mapping data based upon the current texture map position.

23. The non-transitory computer readable storage medium of claim 22 wherein approximation of Euclidian norms is generated by using a polygonal Minkowski norm.

24. The non-transitory computer readable medium of claim 22 wherein the first set of instructions or the second set of instructions are hardware description language (HDL) instructions.

* * * * *